(12) United States Patent
Von Thal et al.

(10) Patent No.: US 7,246,774 B2
(45) Date of Patent: Jul. 24, 2007

(54) IN-FLIGHT REFUELING SYSTEM, BOOM, AND METHOD FOR EXTENDING RANGE OF MOTION OF AN IN-FLIGHT REFUELING BOOM

(75) Inventors: German Von Thal, Laguna Niguel, CA (US); Harry W. Slusher, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 10/898,601

(22) Filed: Jul. 23, 2004

(65) Prior Publication Data

US 2007/0084968 A1    Apr. 19, 2007

(51) Int. Cl.
*B64D 39/00* (2006.01)
(52) U.S. Cl. .................................. 244/135 A
(58) Field of Classification Search ............ 244/135 R, 244/135 A
See application file for complete search history.

(56) References Cited

U.S. PATENT DOCUMENTS

| | | | |
|---|---|---|---|
| 2,859,002 A | | 11/1958 | Leisy |
| 4,072,283 A | * | 2/1978 | Weiland ................. 244/135 A |
| 4,231,536 A | * | 11/1980 | Ishimitsu et al. ....... 244/135 A |
| 4,586,683 A | | 5/1986 | Kerker |
| 5,785,276 A | | 7/1998 | Ruzicka |
| 6,994,294 B2 | * | 2/2006 | Saggio et al. ........... 244/135 A |

* cited by examiner

*Primary Examiner*—Michelle Clement
*Assistant Examiner*—Benjamin P. Lee
(74) *Attorney, Agent, or Firm*—Alston & Bird LLP

(57) ABSTRACT

An in-flight refueling system, boom, and method are provided for extending the range of motion of an in-flight refueling boom carried by a first aircraft so as to facilitate an in-flight refueling operation between the first and the second aircraft. More specifically, in some embodiments the present invention provides a rotating device, operably engaged with at least one airfoil, and configured to substantially surround and rotate about the in-flight refueling boom such that the rotating device and the at least one airfoil operably engaged therewith, may be actuated so as to extend the range of motion of the in-flight refueling boom.

20 Claims, 4 Drawing Sheets

IN-FLIGHT REFUELING SYSTEM, BOOM, AND METHOD FOR EXTENDING RANGE OF MOTION OF AN IN-FLIGHT REFUELING BOOM

FIELD OF THE INVENTION

The present invention relates generally to in-flight refueling of a manned or unmanned aircraft using a boom in-flight refueling system, and specifically, providing a rotating device configured to surround an in-flight refueling boom, wherein the rotating device is operably engaged with an airfoil, such that the in-flight refueling boom may be pivoted through a horizontal and vertical range of motion due to the cooperation of the rotating device with the airfoil operably engaged therewith.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, precise positioning of a second aircraft (the receiver aircraft, for example) with respect to a first aircraft (the tanker aircraft, for example) is required in order to provide a safe engagement of the first aircraft (and a refueling system carried thereby) with the second aircraft for the dispensing of fuel. The requirement of precise relative spatial positioning of two rapidly moving aircraft makes in-flight refueling a challenging operation.

One conventional system for in-flight refueling is the boom in-flight refueling system. The boom in-flight refueling system typically comprises a rigid boom carried by and lowered from a rear portion of a fuselage of a first aircraft. The aft end of the boom includes an extendable tube with a refueling nozzle attached to its aft end. The forward end of the boom is attached to the first aircraft and may be pivoted in the vertical and lateral directions. Near the aft end of the boom are airfoils, which may be controlled by an in-flight refueling system operator onboard the first aircraft. The airfoils provide maneuverability of the boom with respect to an aircraft that is to be refueled (the second aircraft) and allow the in-flight refueling operator to position the boom relative to the second aircraft, by for instance, actuating the airfoils so as to "fly" the boom to a refueling position relative to the second aircraft. First, an operator of the second aircraft must maneuver the second aircraft to within an in-flight refueling position, below and aft of the first aircraft. Upon maneuvering into the in-flight refueling position, the in-flight refueling system operator on board the tanker aircraft may control the airfoils to position the boom such that the extendable refueling nozzle of the boom may be extended to engage a refueling receptacle on the second aircraft. The in-flight refueling system operator is responsible for maintaining the position of the boom relative to the refueling receptacle as the refueling nozzle is extended towards the second aircraft. The in-flight refueling system operator, however, may have limited control of the in-flight refueling boom, due to the range of motion of the in-flight refueling boom and the airfoils attached thereto, as described below.

In conventional boom in-flight refueling systems, the airfoils are attached to an end of the boom and radially extend from the boom in a "V" configuration such that the airfoils may be configured to control the in-flight refueling boom through both a vertical range of motion (elevation, for instance) and a horizontal range of motion (azimuth, for instance). According to conventional systems, the airfoils typically rotate only about a torque tube defined by within the airfoil (wherein the torque tube may be positioned anywhere within the airfoil or along a leading edge of the airfoil, the leading edge being an edge of the airfoil nearest the tanker aircraft). As such, the airfoils of conventional boom in-flight refueling systems may have a relatively limited range of motion such that they may be ineffective in controlling the in-flight refueling boom outside of a limited elevation and azimuth range. As such, the in-flight refueling operator may not be able to adequately control to the in-flight refueling boom to engage a refueling receptacle carried by a second aircraft when the second aircraft approaches the tanker aircraft from a position outside the relatively limited range of motion of the in-flight refueling boom. This may be problematic in cases wherein, for instance, the second aircraft is a large aircraft, such as for instance a bomber aircraft or airlift aircraft having a large amount of control inertia. In such cases, it may be difficult for an operator of the second aircraft to adjust the position of the second aircraft relative to the first aircraft and the second aircraft may be forced to abort the approach to the tanker aircraft and return for another approach in an attempt to attain a position relative to the tanker aircraft wherein the limited range of motion of the in-flight refueling boom will allow it to become engaged with the refueling receptacle carried by the second aircraft. The delay incurred by having to retry a tanker approach in this manner may be detrimental to military missions having critical time constraints. In addition, the second aircraft may have very little fuel remaining upon approaching the tanker aircraft, such that it may be critical to the safety of the second aircraft and the crew aboard that the first tanker approach results in a refueling engagement with the in-flight refueling boom.

Thus, it would be advantageous to improve the range of motion of the airfoils such that the range of elevation and azimuth travel of the in-flight refueling boom (relative to the tanker aircraft) may be expanded relative to conventional boom in-flight refueling systems. This may, in turn, allow the in-flight refueling operator to have improved control over the in-flight refueling boom so as to more effectively engage a refueling receptacle carried by the second aircraft even in cases where the second aircraft approaches the tanker aircraft from a position outside the most optimal in-flight refueling position.

Therefore, there exists a need for an in-flight refueling system, boom, and method that provides for an increased range of elevation and azimuth travel for the in-flight refueling boom, relative to the tanker aircraft from which it extends during an in-flight refueling operation. Thus, there exists a need for an airfoil operably engaged with an in-flight refueling boom such that the airfoil has an expanded range of motion so as to have the capability of guiding the in-flight refueling boom through an expanded range of elevation and azimuth travel relative to conventional boom in-flight refueling systems.

SUMMARY OF THE INVENTION

The embodiments of the present invention satisfy the needs listed above and provide other advantages as described below. The in-flight refueling system and in-flight refueling boom of the present invention provide an airfoil operably engaged with an in-flight refueling boom extending from a tanker aircraft, wherein the airfoil is configured to be capable of rotating about the in-flight refueling boom so as to position the in-flight refueling boom relative to the tanker aircraft by guiding the in-flight refueling boom through an expanded range of elevation and azimuth travel relative to conventional boom in-flight refueling systems. The in-flight refueling system of the present invention includes a tanker aircraft comprising a fuselage; an in-flight refueling boom defining a longitudinal axis and configured to be carried by the tanker aircraft so as to extend from the fuselage of the tanker aircraft; and at least one airfoil operably engaged with, and extending radially outward from the in-flight refueling boom. The at least one airfoil is further configured to be capable of rotating about the longitudinal axis of the in-flight refueling boom so as to position the in-flight refueling boom relative to the fuselage of the tanker aircraft.

According to other embodiments, the in-flight refueling system and in-flight refueling boom of the present invention may further include a rotating device, operably engaged with the in-flight refueling boom and configured to substantially surround a portion of the in-flight refueling boom. Furthermore, the rotating device may be operably engaged with the at least one airfoil and may be configured to cooperate with the end of the in-flight refueling boom and the at least one airfoil such that the at least one airfoil may be capable of rotating about the longitudinal axis of the in-flight refueling boom. According to some embodiments the rotating device may be further configured to be capable of rotating about the longitudinal axis of the in-flight refueling boom. The at least one airfoil may be further configured to be capable of rotating with respect to the rotating device about the longitudinal axis of the in-flight refueling boom. The in-flight refueling system and in-flight refueling boom of one embodiment may further comprise a controller operably engaged with the in-flight refueling boom wherein the controller is configured to rotate the at least one airfoil about the in-flight refueling boom.

The embodiments of the present invention also provide a method for positioning an in-flight refueling boom relative to a tanker aircraft configured to carry the in-flight refueling boom. The method of one embodiment rotates at least one airfoil that is operably engaged with, and that extends radially outward from, the in-flight refueling boom about the longitudinal axis of the in-flight refueling boom so as to position the in-flight refueling boom relative to the fuselage of the tanker aircraft. In this regard, the rotation may include rotating a rotating device that is configured to substantially surround a portion of the in-flight refueling boom and that operably engages the at least one airfoil about the longitudinal axis of the in-flight refueling boom. As such, the at least one airfoil may rotate with the rotating device about the longitudinal axis of the in-flight refueling boom.

Thus the various embodiments of the in-flight refueling system, in-flight refueling boom, and method of the present invention provide many advantages that may include, but are not limited to: providing an in-flight refueling system wherein the in-flight refueling boom has greater maneuverability that an in-flight refueling boom of a conventional boom in-flight refueling system, and providing an in-flight refueling boom capable of a greater range of motion through an expanded range of elevation and azimuth travel relative to conventional boom in-flight refueling systems. Other advantages of the present invention include, the ability to rotate at least one airfoil about a longitudinal axis of the in-flight refueling boom so as to allow the at least one airfoil to be stowed in a position relative to a tanker aircraft that may be aerodynamically advantageous to the tanker aircraft while in flight.

These advantages and others that will be evident to those skilled in the art are provided in the in-flight refueling system, in-flight refueling boom, and method of the present invention.

BRIEF DESCRIPTION OF THE DRAWINGS

Figure 1:
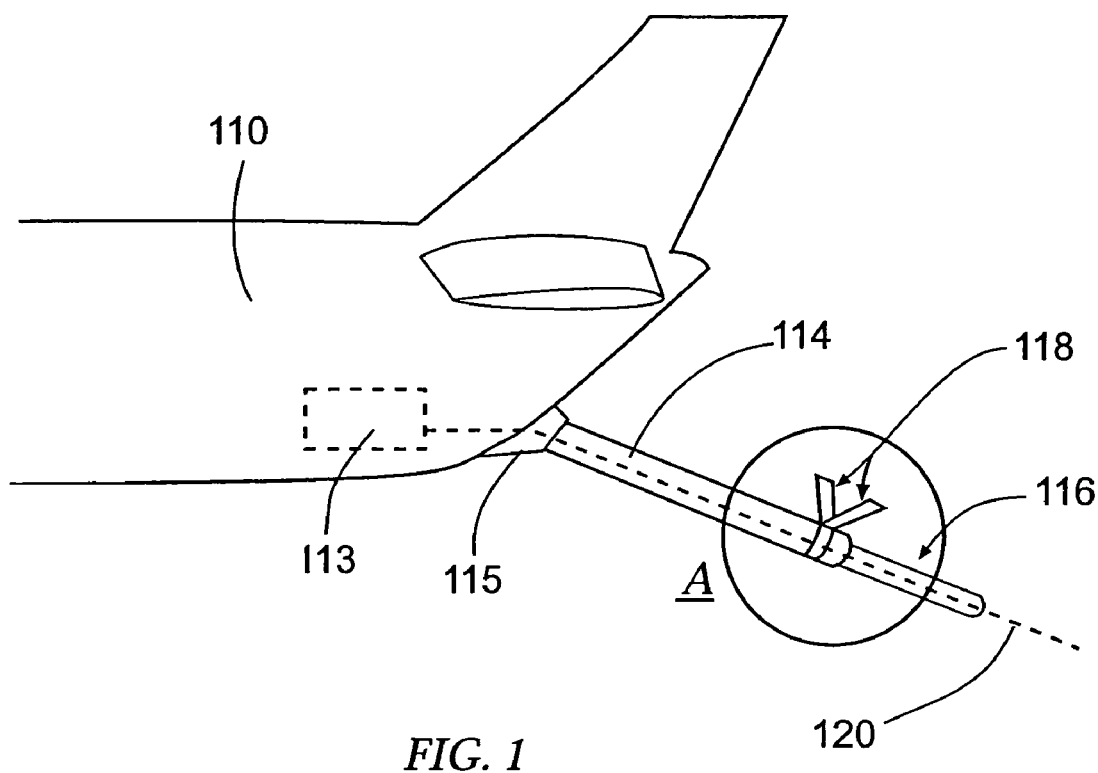
Figure 2:
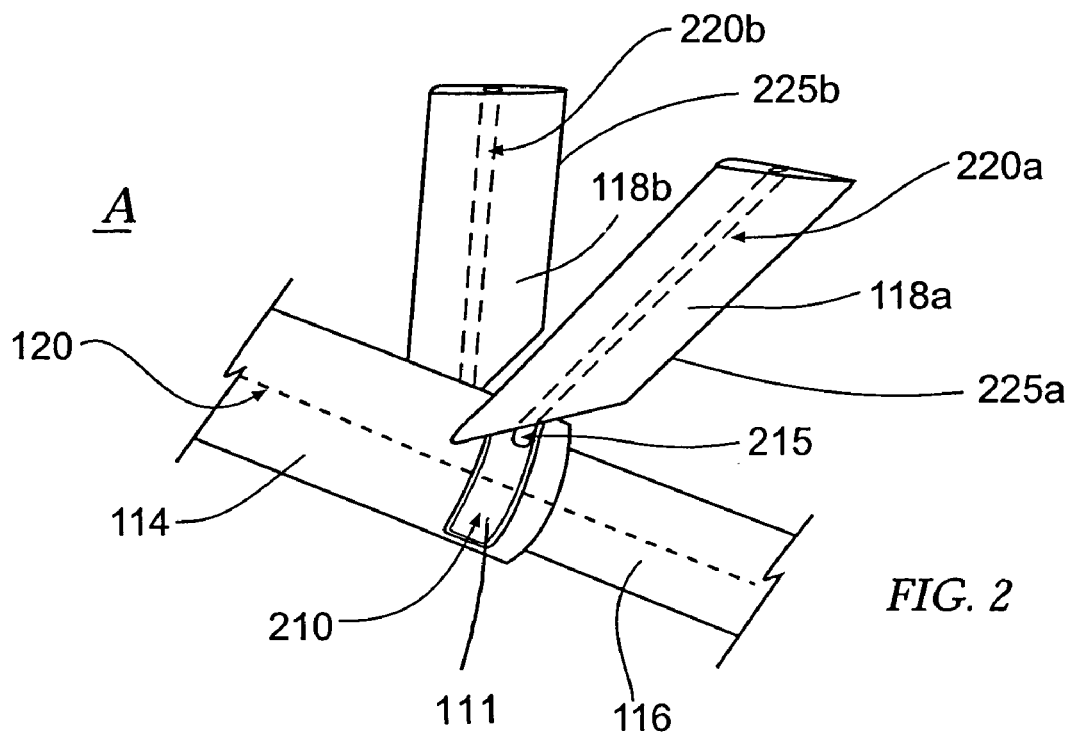
Figure 3:
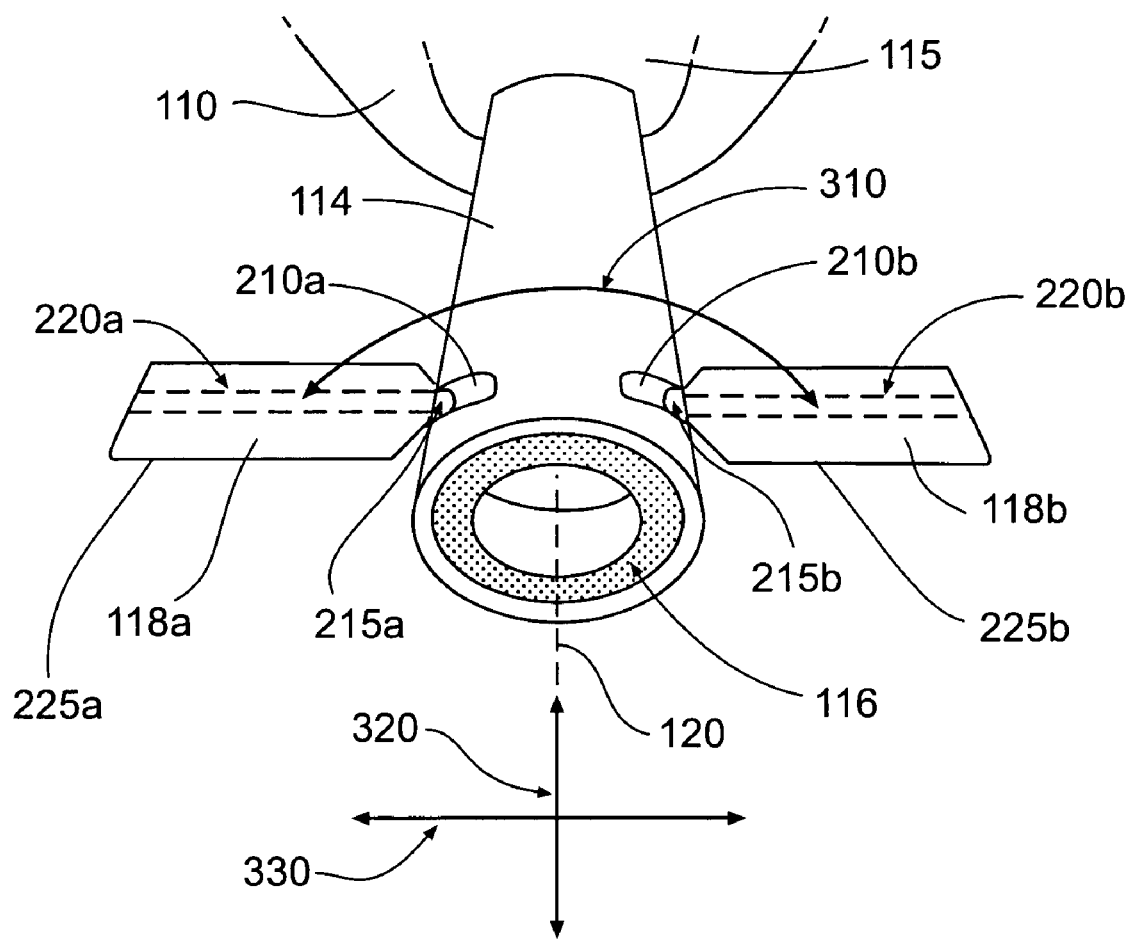
Figure 4:
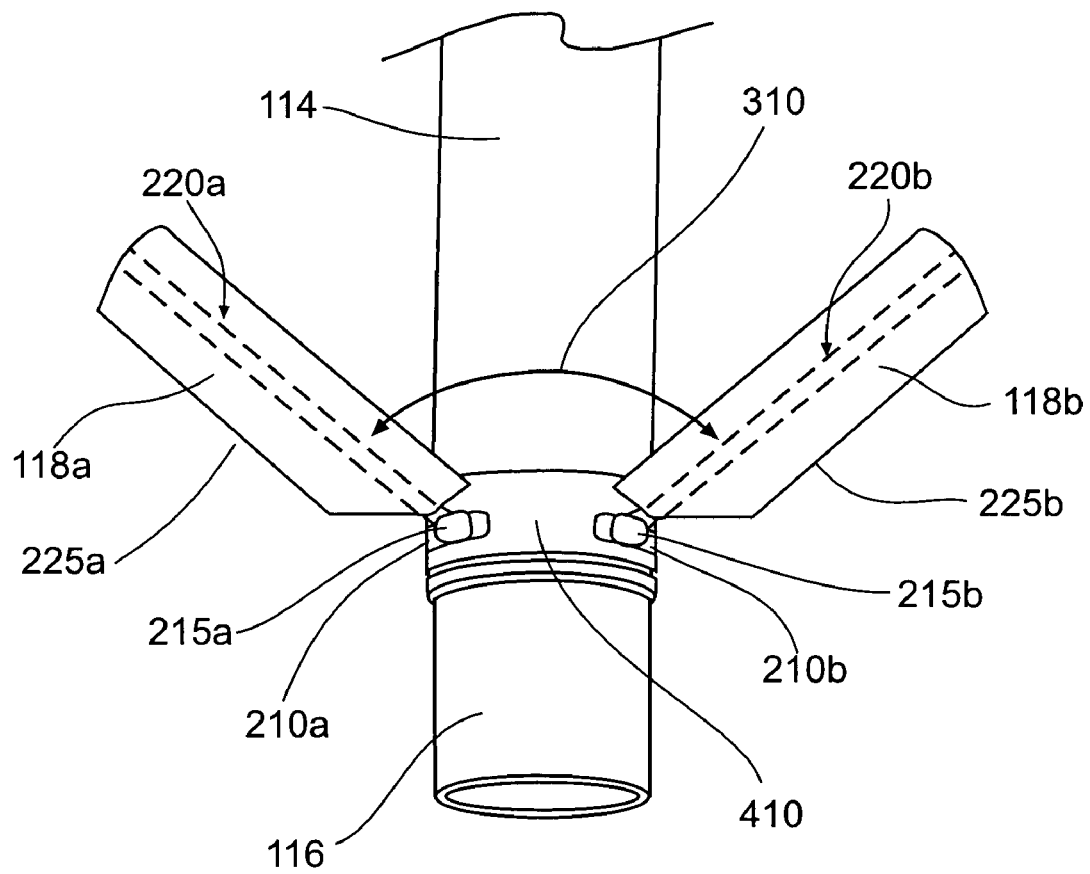
Figure 5:
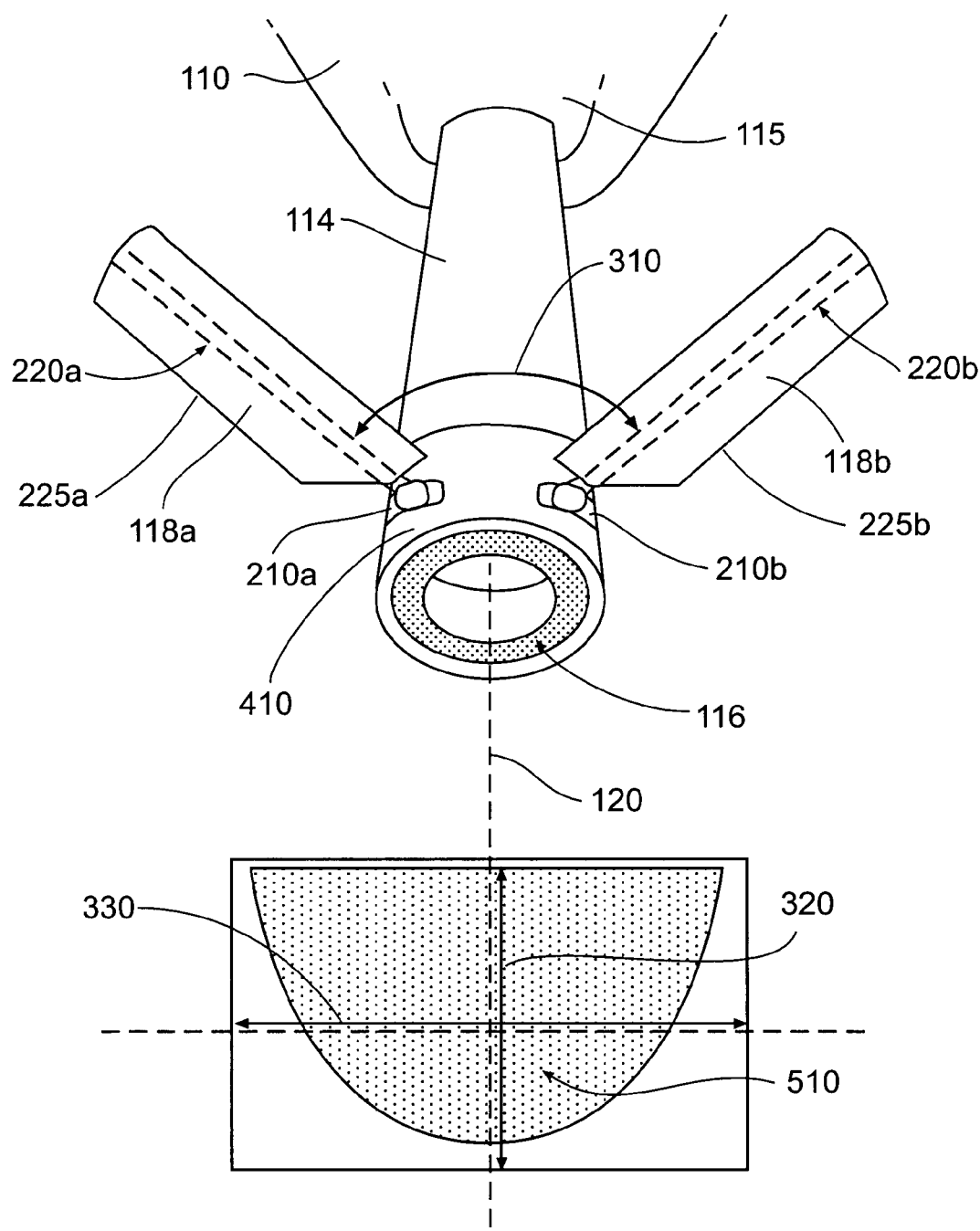

Having thus described the invention in general terms, reference will now be made to the accompanying drawings, which are not necessarily drawn to scale, and wherein:

FIG. 1 shows a tanker aircraft and an in-flight refueling boom extending therefrom;

FIG. 2 shows an in-flight refueling boom and a pair of airfoils operably engaged therewith according to one embodiment of the in-flight refueling system of the present invention;

FIG. 3 shows a rear view of an in-flight refueling boom and a pair of airfoils operably engaged therewith wherein the airfoils are rotated so as to be disposed about 180 degrees apart;

FIG. 4 shows a rear view of an in-flight refueling boom having a rotating device and a pair of airfoils operably engaged therewith according to one embodiment of the present invention; and FIG. 5 shows a rear view of an in-flight refueling boom of the present invention as well as a range of elevation and azimuth travel though which the in-flight refueling boom may travel relative to a neutral trailing position aft and below a tanker aircraft.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 of the present invention shows a boom in-flight refueling system according to one embodiment of the present invention wherein an in-flight refueling boom 114 is carried by, and extended from, a tanker aircraft 110 such that the tanker aircraft 110 may be configured to conduct an in-flight refueling operation by using, for instance, an airfoil 118 (such as, for instance, a ruddervator), to maneuver the in-flight refueling boom 114 such that an extendable nozzle 116 may be extended therefrom so as to engage a refueling receptacle carried by a second aircraft (not shown) that may be positioned to the rear and aft of the tanker aircraft 110. The airfoil 118 may be configured to be actuated by an operator of the in-flight refueling system so as to cause the in-flight refueling boom 114 to be pivoted about a pivoting device 115 (such as, for instance, a pintle) so as to maneuver the in-flight refueling boom 114 into a refueling position relative to the second aircraft.

More particularly, as shown in FIGS. 1 and 2, the in-flight refueling system according to one embodiment of the present invention may comprise a tanker aircraft 110, an in-flight refueling boom 114 defining a longitudinal axis 120, wherein the in-flight refueling boom 114 is configured to be carried by and extend from the tanker aircraft 110, and at least one airfoil 118a, 118b extending radially outward from the in-flight refueling boom 114. As shown in FIGS. 2 and 3, the in-flight refueling system may comprise a first airfoil 118a and a second airfoil 118b configured to be capable of rotating about the longitudinal axis 120 of the in-flight refueling boom 114 so as to pivot the in-flight refueling boom 114 relative to the fuselage of the tanker aircraft 110. While an in-flight refueling system having two airfoils 118a, 118b is described, the in-flight refueling system could have any number of airfoils. The airfoils 118a, 118b include a torque tube 220 (or other hinging device) extending outward from a support fitting 215 that may be attached to the in-flight refueling boom 114. The torque tube 220 could be located within the airfoil 118a, 118b at any location that is aerodynamically and structurally advantageous. For instance, in some embodiments the torque tube 220 may be disposed in a central portion of the airfoil 118a, 118b or, in some instances, along a leading edge of the airfoil 118a, 118b that may be disposed substantially upstream in an air flow from a corresponding trailing edge 225. The airfoil 118a, 118b may thus rotate in the support fitting 215, about the centerline of the torque tube 220 (or other hinging device) such that the airfoil 118a, 118b may act as a control surface (similar to an aileron and/or rudder) so as to impart lift, drag, and/or other control inputs to the in-flight refueling boom 114 so as to further maneuver the in-flight refueling boom 114 relative to the pivot device 115. As such, an operator of the in-flight refueling system may control the airfoils 118a, 118b, and thus, the in-flight refueling boom 114 so that the in-flight refueling boom 114 may engage a refueling receptacle carried by a second aircraft (not shown) that may approach a refueling position aft and below the tanker aircraft 110.

Furthermore, according to embodiments of the present invention, the support fitting 215 of the airfoils 118a, 118b may be configured to extend into and be operably engaged with a channel 210 defined in the in-flight refueling boom 114 (FIG. 3) or a collar mounted thereon (FIG. 4) such that the airfoils 118a, 118b may be configured to rotate through the channel 210 and about the longitudinal axis 120 of the in-flight refueling boom 114. In addition to rotating the airfoils 118a, 118b about the longitudinal axis 120, the trailing edges 225a, 225b of the two airfoils 118a, 118b may be capable of rotating about a respective support fitting 215a, 215b so as to provide control inputs to the in-flight refueling boom 114 as it is trailed behind the tanker aircraft 110 during an in-flight refueling operation. By controllably rotating the airfoils 118a, 118b about the longitudinal axis 120 of the in-flight refueling boom 114 and correspondingly actuating their respective trailing edges 225a, 225b, the in-flight refueling boom 114 may be pivoted through an enlarged elevation 320 and azimuth 330 with respect to the pivot device 115. As shown in FIG. 5 and described more particularly below, the embodiments of the present invention may allow the airfoils 118a, 118b to rotate about the in-flight refueling boom 114 such that the range of elevation 320 and azimuth 330 travel of the in-flight refueling boom 114 may be expanded when compared to conventional in-flight refueling systems having a pair of airfoils arranged in a fixed "V" configuration with respect to the in-flight refueling boom.

As shown in FIG. 3, the airfoils 118a, 118b may be rotated about the in-flight refueling boom 114 within the channels 210a, 210b defined in the in-flight refueling boom 114 such that the airfoils may be positioned about the longitudinal axis 120 of the in-flight refueling boom 114 and separated by, for instance, a separation angle 310. The in-flight refueling boom 114 generally defines one circumferentially extending channel 210 for each airfoil 118. Each channel extends through a pre-defined angular range, such as an angular range of about 150 degrees, that defines the maximum angular range through which the airfoil 118 may be moved. For example, as shown in FIG. 3, the airfoils 118a, 118b may be positioned about 180 degrees apart at about the 3 o'clock and 9 o'clock positions relative to the longitudinal axis 120 of the in-flight refueling boom 114. As such, the airfoils 118a, 118b, and the trailing edges 225a, 225b thereof, may impart a greater vertical force on the in-flight refueling boom 114 so as to increase the elevation 320 through which the in-flight refueling boom 114 may travel with respect to the pivot device 115. In addition, one skilled in the art will appreciate that as the airfoils 118a, 118b may be advantageously positioned with a separation angle of about 180 degrees as the in-flight refueling boom 114 is pivoted upwards and stowed with respect to a rear portion of the fuselage of the tanker aircraft 110. In such a position, the airfoils 118a, 118b may be positioned so as to impart additional lift and/or stability to the rear of the tanker aircraft 110 as the in-flight refueling boom 114 is stowed with respect to the tanker aircraft 110.

According to the various embodiments of the present invention, the airfoils 118a 118b may alternatively be positioned such that the separation angle 310 between the airfoils 118a, 118b may be substantially less, such as about 60 degrees, such that the first airfoil 118a may be positioned at about the 11 o'clock position and the second airfoil 118b may be positioned at about the 1 o'clock position relative to the longitudinal axis 120 of the in-flight refueling boom 114. In such a position, the airfoils 118a, 118b, and the trailing edges 225a, 225b thereof, may impart a greater horizontal force on the in-flight refueling boom 114 as the so as to increase the azimuth 330 (or horizontal range of motion) through which the in-flight refueling boom 114 may travel with respect to the pivot device 115. In addition, depending on the control inputs required to maneuver the in-flight refueling boom 114 into an in-flight refueling position relative to a refueling receptacle carried by a second aircraft, the airfoils 118a, 118b of the present invention may be rotated about the in-flight refueling boom 114 in the channels 210a, 210b defined therein so as to assume a suitable separation angle 310 so as to impart a vertical and/or horizontal control input to the in-flight refueling boom 114. In addition, each of the first airfoil 118a and the second airfoil 118b may be actuated independently such that, for instance, the first airfoil 118a may be rotated to a substantially horizontal position (such as about the 9 o'clock position relative to the longitudinal axis 120 of the in-flight refueling boom 114) and the second airfoil 118b may be rotated to a substantially vertical position (such as about the 12 o'clock position relative to the longitudinal axis 120 of the in-flight refueling boom 114). This relative position of the airfoils 118a, 118b may allow the in-flight refueling boom 114 to be movable partially through a range of elevation 320 (by actuating the trailing edge 225a of the first airfoil 118a (acting substantially as an aileron) and to be movable partially through a range of azimuth 330 (by actuating the trailing edge 225b of the first airfoil (acting substantially as a rudder)). In addition, an operator of the in-flight refueling system (or the controller 113 operably engaged with the airfoils 118a, 118b and/or channels 210a, 210b, as described more fully below) may control each airfoil 118a, 118b independently or in unison to as to provide suitable control inputs to the in-flight refueling boom 114 so as to enable the safe and expeditious engagement thereof with a refueling receptacle carried by a second aircraft.

FIG. 4 shows another embodiment of the in-flight refueling system, boom, and assembly of the present invention further comprising a rotating device 410, such as, for instance, a collar device, operably engaged with and configured to substantially surround a portion of the in-flight refueling boom 114 (typically a portion of the distal end of the in-flight refueling boom 114). The rotating device 410 may substantially surround and be configured to rotate about, the in-flight refueling boom 114. In some instances, the rotating device 410 may be seated in an indentation circumferentially defined in the surface of the in-flight refueling boom 114. Furthermore, the indentation may comprise a radial electric motor; a radial induction motor; a radial electromechanical device; a circular ball bearing assembly; an actuator track; and combinations thereof in order to secure and actuate the rotating device 410 within the indentation and to cause the rotating device 410 to rotate about the in-flight refueling boom 114. In other embodiments, the indentation may provide a smooth conductive and/or magnetic surface suitable for interacting with the rotating device 410 wherein the rotating device 410 may comprise a radial electric motor; a radial induction motor; a radial electromechanical device; a circular ball bearing assembly; an actuator track; and combinations thereof suitable for rotating the rotating device 410 about the in-flight refueling boom 114 (or the indentation defined therein). According to some advantageous embodiments, the rotating device 410 may be in communication with a controller 113 (as described more fully below) configured to rotate the rotating device 114 about the in-flight refueling boom 114 via, for instance, a electrical, hydraulic, or electromechanical connection between the rotating device 410 and the in-flight refueling boom 114. The rotating device 410 may operably engage the airfoils 118a, 118b and may be further configured to cooperate with the in-flight refueling boom 114 and the airfoils 118a, 118b such that the airfoils 118a, 118b may rotate about the in-flight refueling boom 114. As shown in FIG. 4, the rotating device 410 may further define a pair of channels 210a, 210b that may be configured to receive the support fittings 215a, 215b attached to the torque tubes 220a, 220b of the airfoils 118a, 118b. Thus, according to some embodiments, the airfoils 118a, 118b may be rotated relative to and through the respective channels 210a, 210b defined by the rotating device 410 (and/or the in-flight refueling boom 114) and relative to one another so as to be separated by any desired separation angle 310 within a pre-defined range as described above. As a result of the channels 210a, 210b defined by the rotating device 410, the in-flight refueling boom 114 of this embodiment need not define additional channels.

Instead of permitting rotation of the airfoils 118a, 118b relative to the rotating device 410 so as to controllably vary the separation angle 310 therebetween, the airfoils 118a, 118b may also be affixed to or otherwise adapted to rotate with the rotating device 410 such that the separation angle 410 remains fixed between the airfoils 118a, 118b. In this embodiment, the rotating device 410 may be configured to be capable of rotating about the in-flight refueling boom such that the airfoils 118a, 118b (fixed with respect to each other and separated by a selectively fixed separation angle 310) may be rotated concurrently about the in-flight refueling boom 114. In some embodiments, as shown in FIG. 4, the airfoils 118a, 118b may be capable of rotating individually with respect to channels 210a, 210b defined in a rotating device 410 that may further rotate about the in-flight refueling boom 114. This configuration may allow for more precise control of the control surfaces (such as the trailing edges 225a, 225b) of the airfoils 118a, 118b such that the airfoils 118a, 118b may more precisely pivot the in-flight refueling boom 114 through a range of elevation 320 and azimuth 330 (see FIG. 3) with respect to the pivot device 115 that may be carried by the tanker aircraft 110. For instance, the airfoils 118a, 118b may be first rotated relative to and through the respective channels 210a, 210b defined by the rotating device 410 so as to be separated by any desired separation angle 310. Then, the airfoils 118a, 118b may also be affixed to or otherwise adapted to rotate with the rotating device 410 such that the separation angle 410 remains fixed between the airfoils 118a, 118b. Thus, an optimum separation angle 310 may be achieved between the airfoils 118a, 118b so as to achieve an enlarged range of elevation 320 and/or azimuth 330 travel for the in-flight refueling boom 114 relative to the pivot device 115, and the airfoils may then be rotated about the in-flight refueling boom 114 (while either maintaining or adjusting the separation angle 310) so as to precisely guide the in-flight refueling boom 114 through the range of elevation 320 and azimuth 330.

Furthermore, in some embodiments, the airfoils 118a, 118b may each be fixed with respect to one of a pair of rotating devices 410 configured to substantially surround and to be capable of rotating about the in-flight refueling boom 114 (in, for instance, an indentation defined therein). In such an embodiment, an aft rotating device may be configured to be operably engaged with the first airfoil 118a and a forward rotating device may be configured to be operably engaged with the second airfoil 118b. Thus, each airfoil 118a, 118b may be rotated relative to the other so as to achieve a selected separation angle 310 and subsequently the airfoils 118a, 118b may be rotated in unison (by rotating each of the forward and aft rotating devices 410 in unison). In such embodiments, the independent rotation of each rotating device 410 about the in-flight refueling boom 114 (and the resulting independent rotation of the airfoils 118a, 118b extending therefrom) may preclude the need for channels 210a, 210b to be defined in either the in-flight refueling boom 114 or the rotating device 410.

According to some embodiments as shown in FIG. 2, the channel 210 may comprise an actuating mechanism 111, such as a radial actuating track configured to carry the support fitting 215 and the airfoil 118 extending therefrom. Furthermore, as shown in FIG. 3, a pair of channels 210a, 210b may also comprise complementary actuating mechanisms 111 (such as, for instance, bearing tracks) configured to retain the support fittings 215a, 215b such that the airfoils 118a, 118b extending therefrom may be actuated with respect to the in-flight refueling boom 114 along the channels 210a, 210b defined in the in-flight refueling boom 114. In either instance, the support fittings 215a, 215b are engaged by the channel (or an actuating mechanism 111 disposed in conjunction therewith) so as to secure the airfoils 118a, 118b to the in-flight refueling boom 114 and/or the rotating device 410. The airfoils 118a, 118b may be actuated by the actuating mechanism 111 so as to move within the channels 210a, 210b by hydraulic, electrical, mechanical, or other mechanisms such that the airfoils 118a, 118b may be configured to be capable of rotating with respect to the longitudinal axis 120 of the in-flight refueling boom 114. For example, a linear induction motor disposed substantially within the channels 210a, 210b may provide the motive force so as to move the airfoils either individually, or in tandem, in response to control signals received from a controller 113 (discussed below). In addition, the support fittings 215a, 215b may be held in place within the channels 210 via a bearing assembly that may be constrained such that the support fittings 215a, 215b may be movable by, for instance, a linear induction motor, through the radial angular range defined by the channels 210, but may be constrained against being pulled radially outward from the channel 210. In some embodiments, the airfoils 118a, 118b may be composed, for instance, of lightweight materials (such as, for instance, carbon fiber composite materials) so as to decrease the weight load experienced by the support fittings 215a, 215b and/or the complementary bearing assembly disposed within the channel 210 that may be utilized to secure the support fittings 215a, 215b. Moreover, in conjunction with the embodiment of FIG. 4, the rotating device 410 may also comprise an actuating mechanism 111 such as a radial electric motor; a radial induction motor; a radial electromechanical device; a circular ball bearing assembly; an actuator track; and combinations thereof suitable for rotating the rotating device 410 about the in-flight refueling boom 114. According to some advantageous embodiments, the rotating device 410 may be in communication with a controller 113 (as described more fully below) configured to rotate the rotating device 410 (and the airfoils 118a, 118b extending therefrom), about the in-flight refueling boom 114 via, for instance, an electromechanical connection between the rotating device 410 and the in-flight refueling boom 114. As described above, the rotating device 410 may, in some embodiments, be configured to be seated in an indentation defined in the in-flight refueling boom 114 wherein the indentation may further comprise a magnetic and/or conductive surface suitable for interacting with the rotating device 410 and causing the rotation thereof with respect to the in-flight refueling boom 114.

Furthermore, and as shown generally in FIGS. 1 and 3, the airfoils 118a, 118b and/or the rotating device 410 may be in communication with a controller 113 configured to send control inputs to the actuating mechanism 111 disposed within the channels 210a, 210b such as a linear induction motor or the like, to cause the actuating mechanism 111 to rotate the airfoils 118a, 118b about the longitudinal axis 120 of the in-flight refueling boom 114, as described above. The controller 113 may further comprise one or more microprocessors (or other computer devices) and/or input and output devices such that an operator of the in-flight refueling system may monitor and/or control the operation of the controller 113 if required. The controller 113 may be in communication with the actuating mechanism 111 (disposed, for instance, within the channels 210a, 210b) and, in turn, the airfoils 118a, 118b and/or the rotating device 410 so as to control the separation angle 310 between the airfoils 118a, 118b (in embodiments in which the separation angle 310 can vary) and the radial position of each airfoil 118a, 118b with respect to the longitudinal axis 120. Additionally, the controller 113 may provide control signals to the actuating mechanism 111 to cause the airfoils 118a, 118b to rotate about their respective support fittings 215a, 215b so as to position the trailing edges 225a, 225b of the respective airfoils 118a, 118b relative to the torque tubes 220a, 220b (which may, as described below be positioned along the leading edges of the airfoils 118a, 118b or within a center portion of the airfoils 118a, 118b). By adjusting the position of the trailing edges 225a, 225b of the airfoils 118a, 118b in conjunction with the radial positioning steps described above, the pivoting of the in-flight refueling boom 114 through a range of elevation 320 and azimuth 330 is more effectively controlled with respect to the pivot device 115 operably engaged with the tanker aircraft 110. Furthermore, the controller 113 may be in communication with the actuating mechanism 111 via various devices and methods suitable for controlling the actuating mechanism 111, including hydraulic lines, electromechanical devices and/or methods, as well as via electronic connections in communication with one or more electromechanical servo motors operably engaged with the airfoils 118a, 118b (which may be known by those skilled in the art as a "fly-by-wire" control system).

As noted above, in some embodiments, such as that shown generally in FIG. 4, the controller 113 may also be in communication with the rotating device 410 via an actuating mechanism 111 (which may be included within the rotating device) such that the controller 113 may substantially control the rotating device 410 and cause the rotating device 410 (and the airfoils 118a, 118b, operably engaged therewith) to be rotated about the in-flight refueling boom. Also, in embodiments of the present invention comprising a rotating device 410 that also defines channels 210a, 210b therein (see generally, FIG. 4), the controller 410 may be configured to be capable of controlling both the actuation of the airfoils 118a, 118b within the channels 210a, 210b as well as the general rotation of the rotating device 410 about the in-flight refueling boom 114. Thus, the controller 113 may be configured to be capable of adjusting both the separation angle 310 between adjacent airfoils 118a, 118b by controlling the movement of the airfoils 118a, 118b within their respective channels 210a, 210b as well as the radial position of the rotating device 410 about the in-flight refueling boom 114 which controls or sets the angle through which the airfoils 118a, 118b may be moved.

As shown generally in FIG. 1, the controller 113 may be disposed within a fuselage of the tanker aircraft 110. In some embodiments, the controller 113 may be positioned near an operator of the in-flight refueling system such as, for instance, in a remote aerial refueling operator (RARO) station disposed near a forward end of the fuselage of the tanker aircraft 110. The controller 113 may further comprise, control inputs and/or output devices such that the operator of the in-flight refueling system may view images of the in-flight refueling operation and provide control inputs to the controller 113 so as to actuate the airfoils 118a, 118b operably engaged with the end of the in-flight refueling boom 114. As described in more detail above, and shown generally in FIG. 4, the controller 113 may direct the actuating mechanism 111 (disposed for instance, within the channels 210a, 210b) to rotate the airfoils 118a, 118b about the in-flight refueling boom 114 so as to adjust both the angular position of each of the airfoils 118a, 118b as well as the separation angle 310 between the airfoils 118a, 118b. As such, the airfoils 118a, 118b may be positioned relative to the in-flight refueling boom 114 so as to more effectively pivot the in-flight refueling boom 114 relative to the pivot device 115 such that the in-flight refueling boom 114 may be pivoted through a range of elevation 320 and azimuth 330 relative to the pivot device 115. Thus, the controller 113 may translate, for instance, control inputs from the operator of the in-flight refueling system into a series of commands to the actuating mechanism 111 such that the in-flight refueling boom 114 may be pivoted and positioned relative to the tanker aircraft 110 so as to be more capable of completing an in-flight refueling operation with a second aircraft (not shown).

FIG. 5 shows a schematic representation of the range of elevation 320 and azimuth 330 positions that may be attainable by an end of the in-flight refueling boom 114 having the benefit of the advantages provided by some embodiments of the present invention. Also shown in schematic is a range of motion 510 for an in-flight refueling boom fitted with a fixed (i.e., non-rotatable with respect to the longitudinal axis 120 of the in-flight refueling boom 114) pair of airfoils configured in an upright "V" configuration as in a conventional boom in-flight refueling system. As shown, the ability to rotate one or more of the airfoils 118a, 118b relative to the in-flight refueling boom 114 may further allow the in-flight refueling boom 114 to be pivoted through an extended range of elevation 320 and azimuth 330 relative to the pivot device 115 carried by the tanker aircraft 110. Thus, the various embodiments of the present invention may allow, for instance, the in-flight refueling boom 114 to be positioned so as to be capable of engaging (by extending, for instance, the extendable nozzle 116) a refueling receptacle carried by a second aircraft (not shown) that may approach the tanker aircraft 110 from outside the range of motion 510 of a conventional boom in-flight refueling system. In addition, the controller 113 of the present invention may provide precise control over the airfoils 118a, 118b so as to more safely and effectively engage a refueling receptacle carried by a second aircraft.

Referring again to FIG. 2, a method according to one embodiment of the present invention is provided for positioning an in-flight refueling boom 114 defining a longitudinal axis 120, relative to a tanker aircraft 110 (see FIG. 1) configured to carry the in-flight refueling boom 114 such that the in-flight refueling boom 114 is configured to extend below and aft of a fuselage of the tanker aircraft 114 and to pivot about a pivot device 115 carried by the tanker aircraft 110. In one embodiment, the method comprises rotating at least one airfoil 118 operably engaged with, and extending radially outward from, the in-flight refueling boom 114, about the longitudinal axis 120 of the in-flight refueling boom 114 so as to pivot the in-flight refueling boom 114 relative to the fuselage of the tanker aircraft 110.

According to other embodiments, this rotation may further comprise (as shown in FIG. 4) rotating a rotating device 410 that is configured to substantially surround a portion of the in-flight refueling boom 114 about the longitudinal axis 120 of the in-flight refueling boom 114. The rotating device 410 may operably engage (and/or control) the at least one airfoil 118a, 118b (as described more particularly above). As noted above, the rotation of the rotating device 410 may also rotate the at least one airfoil 118a, 118b that is operably engaged therewith. In this regard, the at least one airfoil 118a, 118b may be rotated about the in-flight refueling boom 114.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An in-flight refueling system comprising:
a tanker aircraft comprising a fuselage;
an in-flight refueling boom defining a longitudinal axis, the in-flight refueling boom configured to be carried by the tanker aircraft and to extend from the fuselage thereof;
and at least one airfoil operably engaged with, and extending radially outward from, the longitudinal axis of the in-flight refueling boom, the at least one airfoil being configured to be capable of rotating separately about the in-flight refueling boom so as to pivot the in-flight refueling boom relative to the fuselage of the tanker aircraft.

2. An in-flight refueling system according to claim 1, further comprising a rotating device, operably engaged with and configured to substantially surround a portion of the in-flight refueling boom, the rotating device being operably engaged with the at least one airfoil and configured to cooperate with the end of the in-flight refueling boom and the at least one airfoil such that the at least one airfoil is configured to be capable of rotating about the in-flight refueling boom.

3. An in-flight refueling system according to claim 2, wherein the rotating device is further configured to be capable of rotating about the longitudinal axis of the in-flight refueling boom.

4. An in-flight refueling system according to claim 2, wherein the at least one airfoil is further configured to be capable of rotating with the rotating device about the longitudinal axis of the in-flight refueling boom.

5. An in-flight refueling system according to claim 1, further comprising a controller configured to rotate the at least one airfoil about the longitudinal axis of the in-flight refueling boom.

6. An in-flight refueling system according to claim 2, wherein the rotating device is selected from the group consisting of:
a radial electric motor;
a radial induction motor;
a radial electromechanical device;
a circular ball bearing assembly;
an actuator track; and
combinations thereof.

7. An in-flight refueling boom defining a longitudinal axis and being adapted to extend from a fuselage of a tanker aircraft, the in-flight refueling boom comprising: at least one airfoil operably engaged with, and extending radially outward from, the longitudinal axis of the in-flight refueling boom, the at least one airfoil being configured to be capable of rotating separately about the in-flight refueling boom so as to pivot the in-flight refueling boom relative to the fuselage of the tanker aircraft.

8. An in-flight refueling boom according to claim 7, further comprising a rotating device, operably engaged with and configured to substantially surround a portion of the in-flight refueling boom, the rotating device being operably engaged with the at least one airfoil and configured to cooperate with the end of the in-flight refueling boom and the at least one airfoil such that the at least one airfoil is configured to be capable of rotating about the in-flight refueling boom.

9. An in-flight refueling boom according to claim 8, wherein the rotating device is further configured to be capable of rotating about the longitudinal axis of the in-flight refueling boom.

10. An in-flight refueling boom according to claim 8, wherein the at least one airfoil is further configured to be capable of rotating with the rotating device about the longitudinal axis of the in-flight refueling boom.

11. An in-flight refueling boom according to claim 7, further comprising a controller configured to rotate the at least one airfoil about the longitudinal axis of the in-flight refueling boom.

12. An in-flight refueling boom according to claim 8, wherein the rotating device is selected from the group consisting of:

a radial electric motor;
a radial induction motor;
a radial electromechanical device;
a circular ball bearing assembly;
an actuator track; and
combinations thereof.

13. An assembly adapted to operably engage a refueling boom defining a longitudinal axis, the in-flight refueling boom being adapted to be carried by a tanker aircraft and to extend from a fuselage thereof, the assembly comprising:
at least one airfoil operably engaged with, and extending radially outward from, the longitudinal axis of the in-flight refueling boom, the at least one airfoil being configured to be capable of rotating about the longitudinal axis of the in-flight refueling boom so as to pivot the in-flight refueling boom relative to the fuselage of the tanker aircraft; and
a rotating device, operably engaged with and configured to substantially surround a portion of the in-flight refueling boom, the rotating device being operably engaged with the at least one airfoil and configured to cooperate with the end of the in-flight refueling boom and the at least one airfoil such that the at least one airfoil is configured to be capable of rotating separately about the in-flight refueling boom so as to extend a range of motion of the in-flight refueling boom relative to the fuselage of the tanker aircraft.

14. An assembly according to claim 13, wherein the rotating device is further configured to be capable of rotating about the longitudinal axis of the in-flight refueling boom.

15. An assembly according to claim 13, wherein the at least one airfoil is further configured to be capable of rotating with the rotating device about the longitudinal axis of the in-flight refueling boom.

16. An assembly according to claim 13, further comprising a controller configured to rotate the at least one airfoil about the longitudinal axis of the in-flight refueling boom.

17. An assembly according to claim 13, wherein the rotating device is selected from the group consisting of:
a radial electric motor;
a radial induction motor;
a radial electromechanical device;
a circular ball bearing assembly;
an actuator track; and
combinations thereof.

18. A method for positioning an in-flight refueling boom defining a longitudinal axis, relative to a tanker aircraft configured to carry the in-flight refueling boom, the method comprising:
rotating at least one airfoil separately about the in-flight refueling boom so as to pivot the in-flight refueling boom relative to the fuselage of the tanker aircraft, the at least one airfoil operably engaged with, and extending radially outward from, the longitudinal axis of the in-flight refueling boom.

19. A method according to claim 18, wherein the rotating step further comprises rotating a rotating device that is configured to substantially surround a portion of the in-flight refueling boom and that operably engages the at least one airfoil, wherein rotating the rotating device comprises rotating the rotating device about the in-flight refueling boom.

20. A method according to claim 18, wherein the rotating step further comprises rotating the at least one airfoil with a rotating device that is configured to substantially surround a portion of the in-flight refueling boom and is operably engaged with the at least one airfoil, wherein rotating the at least one airfoil comprises rotating the at least one airfoil about the in-flight refueling boom.

* * * * *